United States Patent [19]
Blickensderfer et al.

[11] 3,827,473
[45] Aug. 6, 1974

[54] TIRE TRACTION DEVICE

[76] Inventors: Robert Blickensderfer, 8191 Butterworth Rd., Maineville, Ohio 45039; Robert Blickensderfer, III, 3312 Elmwood Dr., N.W., Corvallis, Oreg. 97330

[22] Filed: Dec. 16, 1971

[21] Appl. No.: 208,570

[52] U.S. Cl. ............................................... 152/218
[51] Int. Cl. ......................................... B60c 27/02
[58] Field of Search ..................... 152/218, 213, 225

[56] References Cited
UNITED STATES PATENTS

| | | | |
|---|---|---|---|
| 2,426,683 | 9/1947 | Harrop | 152/218 |
| 2,445,913 | 7/1948 | Grosjean et al. | 152/225 |
| 2,598,298 | 5/1952 | Pindjak | 152/225 |
| 2,867,259 | 1/1959 | Barron | 152/218 |
| 2,910,105 | 10/1959 | Binegar | 152/225 |
| 2,963,064 | 12/1960 | Rucker | 152/218 |
| 3,063,489 | 11/1962 | Blumkin | 152/225 |
| 3,073,370 | 1/1963 | Frank | 152/218 |
| 3,283,796 | 11/1966 | White et al. | 152/218 |
| 3,437,121 | 4/1969 | Strapko et al. | 152/218 |

*Primary Examiner*—James B. Marbert
*Attorney, Agent, or Firm*—Shlesinger, Arkwright, Garvey & Dinsmore

[57] ABSTRACT

A traction device for a tire or the like which includes a plurality of traction members; means for adjustably connecting of the traction members in spaced relation to each other; each of the traction members including a yoke and a U-shaped traction element for encircling the tread of a tire in a transverse direction; the U-shaped traction element having the free end of one leg of the U pivotally secured to the yoke; stop means on the yoke for preventing rotation of the traction element in a direction which, when positioned on the tire, would displace the traction element outwardly from the tire tread; and means on the yoke permitting rotational inward displacement of the traction element.

This invention relates to tire traction devices and, more particularly, to an improved emergency device which may be rapidly and easily mounted on and demounted from a vehicle tire to provide increased traction.

15 Claims, 9 Drawing Figures

PATENTED AUG 6 1974

3,827,473

*INVENTOR.*
ROBERT BLICKENSDERFER
ROBERT BLICKENSDERFER III
BY
Shlesinger, Arkwright & Garvey
ATTORNEY

TIRE TRACTION DEVICE

HISTORICAL BACKGROUND

The prior art discloses a number of devices having tire encircling members attached to a hub member such as Grosjean U.S. Pat. No. 2,445,913 and White U.S. Pat. No. 3,283,796. These developments have certain structural differences which impair operation. In particular, the device disclosed in the Grosjean patent shows the traction legs aligned in such a manner that they are constrained to move towards the center of the wheel when they come in contact with the pavement. This results in a rough ride.

White discloses an anti-skid device permitting inward movement of the tread-engaging web. The inward movement of one leg tends to cause outward movement of the other leg about the fulcrum point producing a rough ride. Additionally, springs are utilized for retention of the tread-engaging web which, due to centrifugal force during wheel rotation, tends to cause the tread-engaging members to disengage from the tread at higher speeds.

OBJECTS AND SUMMARY

It is an object of this invention to provide a tire traction device which may be rapidly and easily mounted and demounted.

Another object of this invention is to provide a tire traction device which is of simple, sturdy construction and which may be easily handled for installation and removal.

It is a further object of this invention to provide a traction device which may be folded up for compact storage when not in use.

A further object of this invention is to provide a tire traction device which will increase vehicle traction under snow or ice conditions without substantially increasing the roughness of the ride.

A yet further object of this invention is to provide a tire traction device having tread encircling members the outward radial movement of which is rigidly constrained and the inward radial movement of which is constrained only by the tire upon which the device is mounted thus giving smoother "ride" at high speeds.

A still further object of this invention is to provide a tire traction device which is capable of absorbing the impact of the pavement at high speeds.

A still further object of this invention is to provide a tire traction device which will not collide with the tire or wheel well at high speeds.

These and other objects of this invention and capabilities and advantages will be apparent from the following description, appended claims and accompanying drawings in which:

FIGS. 1 AND 2

Figure 2:
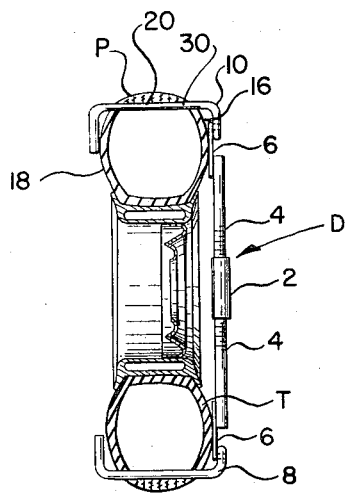
FIG. 2 is a cross-sectional view of FIG. 1 taken along the line A—A and viewed in a direction of the arrows.
Figure 1:
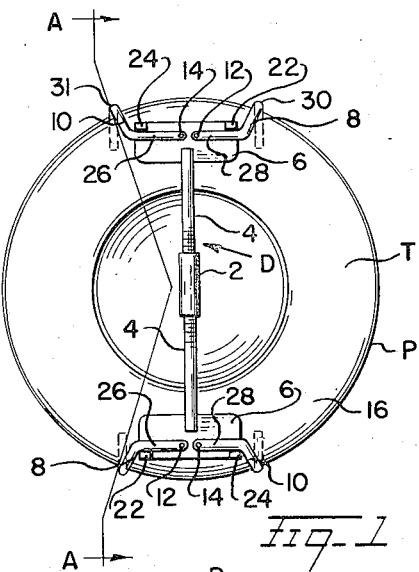
FIG. 1 is an outside elevational view showing the invention mounted on a tire.
Figure 4:
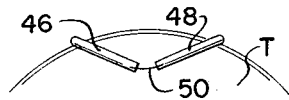
FIGS. 4 and 5 are inside fragmentary elevational views showing two embodiments of the traction leg connecting means.
Figure 3:
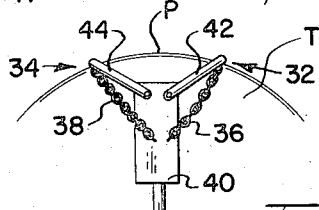
FIG. 3 is an outside fragmentary elevational view of the invention mounted on a tire showing chain stop means.

In FIGS. 1 and 2 the tire traction device D is shown on a pneumatic vehicle tire T having circumferential tread portion P.

The traction device D includes a central connecting member 2 which may be a turnbuckle, over-center lever lock, or any other rigid means. Connected to the adjustable connecting member 2 are two rods or bars 4 which are constructed of a material capable of withstanding the high tensional and bending forces which will occur due to centrifugal force at high speeds. The rods 4 may be lengths of steel bar stock having a circular cross-section and threadably connected to the connector member 2 at their ends. Each of the bars 4 are rigidly secured to a yoke 6 by welding, bolting, etc. The yoke 6 may similarly be constructed of a high strength plate material. Traction elements or arms 8 and 10 are pivotally secured to yoke 6 by pivot pins 12 and 14, respectively, which attach to plate 6. The traction elements 8 and 10 extend from either side of yoke 6, along the outside wall 16 of tire T, over the tread, and down the inside wall 18 a distance sufficient to securely envelope the tire T. The tread elements 8 and 10 are preferably constructed of a material having high strength and hardness to prevent their becoming deformed or eroded through contact with the pavement. If desired, the road engaging surface 20 of the traction elements may be studded or otherwise roughened to provide a greater amount of traction on ice or highly compacted snow.

The yoke or plate 6 is provided with lugs 22 and 24 which extend from plate 6 in a direction away from the tire T. They are positioned adjacent to the extending portions 26 and 28 of traction elements 8 and 10 such as to prevent rotation of elements 8 and 10 in a direction which would displace the tread engaging portions 30 and 31 outwardly from thread portion P of tire T. When traction device D is mounted on a tire T, rotation of traction elements 8 and 10 in an inward direction is limited to the extent which the flex of the tire T itself will permit. When the traction device D is not mounted on a tire T, traction elements 8 and 10 are free to rotate inwardly against rods 4.

The device is mounted as follows: The central connecting member 2 is loosened thereby allowing rods 4 to extend from it a distance sufficiently great that the traction elements 8 and 10 on both yokes 6 are separated by a distance equal to the diameter of the tire. Items 8 and 10 on both yokes 6 may be hooked over opposed portions of the tire tread P. The entire device may then be positioned with rods 4 along a diameter of the tire T. When the device D is positioned on the tire T in the manner just described, the tread engaging portions 30 are snugged up tightly to tread portion P by adjustment of member 2, to bring shafts 4 towards each other. The device D may be easily removed from the tire T by reversing the aforementioned procedure.

FIG. 3

Another way in which the traction elements 32 and 34 may be constrained to the surface of tread of portion P is by means of chains 36 and 38 secured both to the yoke 40 and the portions 42 and 44 of traction elements 32 and 34. As was the case in the previously described embodiment, the traction elements 32 and 34 are prevented from outward displacement while permitted freedom of movement inwardly subject only to the constraint provided by the tire T on which it is mounted.

FIGS. 4 AND 5

The tire encircling traction elements may be folded down to a position adjacent the shaft means which connects the yokes when the device is not in use. To facilitate this, a leaf spring 50 is secured to traction elements 46 and 48, portions of which are shown extending along the side of the tire opposite that on which the device is mounted. The spring 50 is tensioned in a manner similar to a "past dead center" structure as to cause the tension elements 46 and 48 to fold down when they are no longer constrained in their operative position by tire T.

Figure 5:
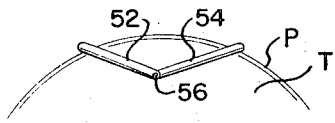

FIG. 5 shows the traction elements 52 and 54 connected by a pivot pin 56. When the traction device is removed from the tire T and the elements 52 and 54 are no longer supported by tread portion P, gravity will force them into a retracted position.

FIGS. 6 AND 7

Figure 6:
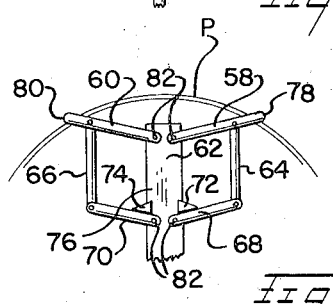
FIGS. 6 and 7 are outside fragmentary elevational views showing various embodiments of the invention mounted on a tire.

In the embodiment shown in FIG. 6, traction arms 58 and 60 are pivotally secured to plate 62 and extend over the tire in the manner previously described. Also pivotally secured to traction arms 58 and 60 are cross braces 64 and 66 which in turn are pivotally connected to arms 68 and 70 at their ends. Arms 68 and 70 are pivotally secured to plate 62 at their other ends in such a way that they are substantially parallel to traction arms 58 and 60. Stop lugs 72 and 74 may be welded to or integral with plate 62 and extend outward from the face 76 of plate 62 a sufficient distance to limit the rotation of arms 68 and 70 in a direction which would displace the tread engaging portions 78 and 80 of traction arms 58 and 60 in a radially outward direction from tire tread P. This embodiment has the advantage of providing stability against rotation of the traction device D about the longitudinal axis of plate 62. In addition, this design provides a more rigid structure and since the forces are distributed, decreases the possibility of pins 82 shearing off.

Figure 7:
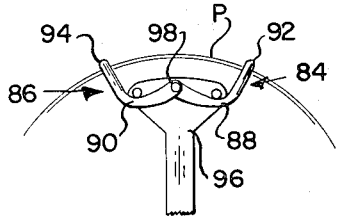
Figure 8:
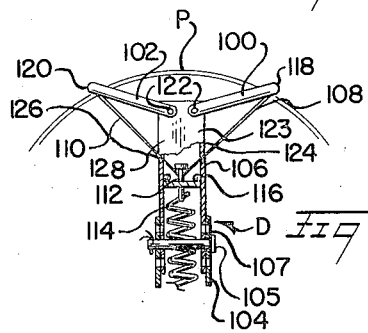
FIG. 8 is an outside fragmentary elevational view of a further embodiment of the invention, a portion of which is shown in section, showing traction leg retracting means.
Figure 9:
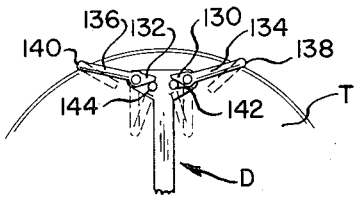
FIG. 9 is an outside fragmentary elevational view of a still further embodiment of the invention mounted on a tire, the retracted position of the traction arms being shown in phantom to illustrate the manner in which the device may be folded up for storage.

The embodiment shown in FIG. 7 is a more streamlined version of the basic traction device in that U-shaped traction elements 84 and 86 which extend over the tread P have arms 88 and 90 which are arcuate. This allows wider separation of tread engaging portions 92 and 94 while requiring a relatively small plate 96. Arms 88 and 90 are pivotally secured to plate 96 by a single pivot 98.

FIG. 8

In this embodiment, the basic traction device has been modified to include means for automatically causing traction arms 100 and 102 to retract when the device D is demounted. The shafts 4, (FIG. 1) have been replaced by a hollow rigid tube 104 in which a rigid hollow tube 106 is telescopically secured. Means for adjusting the tubes 104 and 106 relative to each other may be a bolt 105 traversing the entire diameter of tubes 104 and member 106 through matching holes 107. Secured to traction arms 100 and 102 are cables or rods 108 and 110. Cables 108 and 110 are secured to member 112 which in turn is connected to a weak coil spring 114. Member 112 slides axially in tube 106 and its upward displacement is limited by a stop means 116 which may be a ridge on the inside circumference of tube 106. In this manner traction arms 100 and 102 are prevented from rotating in a direction which would displace tread engaging portions 118 and 120 radially outward from tire tread P. Traction arm pivot pins 122 are provided in yoke 123 comprising the upper portion of tube 106.

In the preferred form of this embodiment tube 104 functions in exactly the same manner as tube 106 and has traction arms (not shown) secured to it in the same manner that arms 100 and 102 are secured to tube 106. When the device D is demounted, the tension of coil spring 114 will cause traction arms 100 and 102 (and corresponding traction arms at the other end of the device D) to fold down along side tube 106 (and tube 104) for compact storage. It is obvious that some means must be provided to enable cables 108 and 110 to move in tube 106 when traction 100 and 102 are retracted to their demounted position. This may be accomplished by providing holes or slots in the sides 124 and 126 of tube 106. An alternative construction would be to provide a slot (not shown) in the face 128 of yoke member 106 through which a portion (not shown) of member 112 may protrude for connection of cables 108 and 110.

FIG. 9

A still further embodiment of this invention would be to rigidly secure ears 130 and 132 to traction arms 134 and 136, respectively. To prevent radial outward placement of tread engaging portions 138 and 140, stop lugs 142 and 144 are positioned below ears 130 and 132.

When the traction device D is removed from the tire T, the traction arms 134 and 136 swing to the dotted line position shown.

While the invention has been described in connection with different embodiments thereof, it will be understood that it is capable of further modification, and this application is intended to cover any variations, uses or adaptations of the invention following, in general, the princples of the invention and including such departures from the present disclosure as come within known or customary practice in the art to which the invention pertains and as may be applied to the essential features herein before set forth and fall with the scope of the invention or the limits of the appended claims.

What I claim is:

1. A traction device for a tire or the like comprising:
   a. a plurality of traction members,
   b. means for adjustably connecting said traction members in spaced relation to each other,
   c. each of said traction members including a yoke and a U-shaped tire tread engaging member, d. said traction member further including means connecting said tread engaging members to said yoke to permit radial inward movement of individual of said tread engaging members independently of the remaining of said tread engaging members, e. said last mentioned means including an arm pivotally secured to said yoke at a position angularly offset from a line passing through said tread engaging member and the axis of rotation of the tire, f. stop means on said yoke for preventing rotation of said arm in a direction which when positioned on a tire would displace said tread engaging member outwardly from the tire tread, and g. means on said yoke for permitting rotational inward displacement of individual of said arms independently of the remaining of said arms when said traction device is mounted on a tire.

2. A traction device as in claim 1 and including:

a. a second traction element pivotally secured to said yoke in spaced relationship with said first mentioned element.

3. A traction device as in claim 2 and wherein:

a. said traction elements are pivotally secured to said yoke at one end of said elements, and b. said traction device includes means for connecting said traction elements together at their other ends thereby permitting relative motion of said traction elements.

4. A traction device as in claim 3 and wherein:

a. said traction element connecting means is a leaf spring.

5. A traction device as in claim 3 and wherein:

a. said traction element connecting means is a pivot pin.

6. A traction device as in claim 1 and including:

a. retracting means associated with said traction member connecting means for urging said traction elements towards said traction member connecting means.

7. A traction device as in claim 6 and wherein:

a. said retracting means includes spring means.

8. A traction device as in claim 1 and wherein said traction member includes:

a. an arm pivotally secured to said yoke and, b. brace means pivotally connected to said arm and said traction element.

9. A traction device as in claim 8 and wherein:

a. said stop means is a lug positioned on said yoke above said arm and below said traction element.

10. A traction device as in claim 1 and wherein:

a. said means for adjustably connecting said traction members includes a turnbuckle.

11. A traction device as in claim 1 and wherein:

a. said stop means includes a lug positioned on said yoke.

12. A traction device as in claim 1 and wherein:

a. said stop means includes a chain secured at one end to said traction element and at the other end to said yoke.

13. A traction device as in claim 1 and including:

a. an ear rigidly secured to said traction element at the point of pivotal securement of said traction element, b. said ear extending from said point of pivotal securement in a direction opposite to that of said traction element, and c. said stop means including a lug positioned on said yoke adjacent to said ear.

14. A traction device as in claim 1 and wherein:

a. said yoke comprises a plate rigidly secured to said traction member connecting means, b. said stop means includes a lug positioned on said plate, and c. said traction element includes an arcuate portion adjacent to said lug when said traction device is mounted on a tire.

15. A traction device as in claim 1 and wherein:

a. said traction element is constrained to rotate about a single axis.

* * * * *